US010536638B2

(12) United States Patent
Komemushi et al.

(10) Patent No.: US 10,536,638 B2
(45) Date of Patent: Jan. 14, 2020

(54) BICYCLE IMAGE CAPTURING DEVICE AND CONTROLLER FOR BICYCLE IMAGE CAPTURING DEVICE

(71) Applicant: Shimano Inc., Sakai, Osaka (JP)

(72) Inventors: Takashi Komemushi, Osaka (JP); Norihiko Ishizaka, Osaka (JP); Piet Deschuymer, CT Nunspeet (NL); Iwan Van Hende, CN Nunspeet (NL)

(73) Assignee: Shimano Inc., Osaka (JP)

( * ) Notice: Subject to any disclaimer, the term of this patent is extended or adjusted under 35 U.S.C. 154(b) by 267 days.

(21) Appl. No.: 15/466,544

(22) Filed: Mar. 22, 2017

(65) Prior Publication Data

US 2017/0295319 A1 Oct. 12, 2017

(30) Foreign Application Priority Data

Apr. 8, 2016 (JP) .................................. 2016-078248

(51) Int. Cl.
*H04N 5/00* (2011.01)
*B62M 6/55* (2010.01)
*H04N 5/232* (2006.01)
*B62J 99/00* (2009.01)
*A42B 3/04* (2006.01)
(Continued)

(52) U.S. Cl.
CPC ....... *H04N 5/23245* (2013.01); *A42B 3/0426* (2013.01); *B62J 99/00* (2013.01); *B62M 6/55* (2013.01); *B62M 6/90* (2013.01); *H04N 5/23216* (2013.01); *H04N 5/23248* (2013.01); *H04N 5/265* (2013.01); *H04N 5/907* (2013.01); *H04N 7/181* (2013.01); *H04N 7/188* (2013.01); *B62J 11/00* (2013.01); *B62J 2099/002* (2013.01); *B62J 2099/004* (2013.01);
(Continued)

(58) Field of Classification Search
CPC ............................. H04N 5/23245; B62M 6/55
USPC ....................................................... 348/148
See application file for complete search history.

(56) References Cited

U.S. PATENT DOCUMENTS 10,116,873 B1 * 10/2018 Campbell .......... H04N 5/23296
2004/0143373 A1 * 7/2004 Ennis ....................... B60R 1/00
701/1

(Continued)

FOREIGN PATENT DOCUMENTS

CN 204425487 U 6/2015
CN 105314061 A 2/2016
(Continued)

OTHER PUBLICATIONS

European Search Report of corresponding European patent Application No. 17 16 1863.0 dated Aug. 31, 2017.

*Primary Examiner* — Jeffery A Williams
(74) *Attorney, Agent, or Firm* — Global IP Counselors, LLP (57) ABSTRACT

A bicycle image capturing device is provided that reduces annoying operations for changing an operation state. The bicycle image capturing device includes a controller. The controller includes a reception unit and an electronic control unit. The reception unit is configured to obtain information related to a component of a bicycle. The bicycle component is operable in at least a first state and a second state that differs from the first state. The electronic control unit is configured to control a first image capturing unit based on the information obtained by the reception unit.

23 Claims, 7 Drawing Sheets (51) Int. Cl.
*B62M 6/90* (2010.01)
*H04N 5/265* (2006.01)
*H04N 5/907* (2006.01)
*H04N 7/18* (2006.01)
*B62J 11/00* (2006.01)
*B62M 9/121* (2010.01)
*B62M 11/16* (2006.01)

(52) U.S. Cl.
CPC ....... *B62J 2099/0013* (2013.01); *B62M 9/121* (2013.01); *B62M 11/16* (2013.01)

(56) References Cited

U.S. PATENT DOCUMENTS

| | | | |
|---|---|---|---|
| 2004/0189722 A1 | 9/2004 | Acres | |
| 2008/0079554 A1* | 4/2008 | Boice | B60R 25/305 340/436 |
| 2011/0234799 A1* | 9/2011 | Mueller | B60R 1/00 348/148 |
| 2015/0274074 A1* | 10/2015 | Petrillo | B60R 1/00 701/36 |
| 2016/0014377 A1 | 1/2016 | Fiegert et al. | |
| 2016/0116356 A1* | 4/2016 | Goldstein | B62J 99/00 73/1.15 |
| 2017/0263120 A1* | 9/2017 | Durie, Jr. | G08G 1/205 |

FOREIGN PATENT DOCUMENTS

| | | | |
|---|---|---|---|
| EP | 2 763 410 A1 | | 8/2014 |
| EP | 2 868 556 A1 | | 5/2015 |
| JP | 05-294188 A | | 11/1993 |
| JP | 2004-361708 A | | 12/2004 |
| JP | 2005-341543 A | | 12/2005 |
| JP | 2007-287035 A | | 11/2007 |
| JP | 2007-288440 A | | 11/2007 |
| JP | 2007288440 A | * | 11/2007 |
| JP | 2011-66790 A | | 3/2011 |
| JP | 2015-92660 A | | 5/2015 |
| KR | 20090035822 A | * | 4/2009 |

\* cited by examiner

BICYCLE IMAGE CAPTURING DEVICE AND CONTROLLER FOR BICYCLE IMAGE CAPTURING DEVICE

CROSS-REFERENCE TO RELATED APPLICATIONS

This application claims priority to Japanese Patent Application No. 2016-078248, filed on Apr. 8, 2016. The entire disclosure of Japanese Patent Application No. 2016-078248 is hereby incorporated herein by reference.

BACKGROUND

Field of the Invention

The present invention generally relates to a bicycle image capturing device and a controller for a bicycle image capturing device.

Background Information

A known image capturing device for a bicycle captures an image of the surrounding scenery or the like when the bicycle is traveling. The image capturing device is attached to the bicycle or the rider. Japanese Laid-Open Patent Publication No. 2007-288440 (Patent document 1) discloses an example of a bicycle image capturing device that captures an image of a blind spot, which cannot be seen by the rider, and shows the image on a head-mounted display.

SUMMARY

When riding a bicycle using the bicycle image capturing device of patent document 1, the rider needs to operate an operation unit of the bicycle image capturing device if the rider wants to change the operation state of the device. Thus, the bicycle image capturing device can be annoying to the rider.

A first aspect of the present invention is a controller for a bicycle image capturing device that includes a reception unit and an electronic control unit. The reception unit is configured to obtain information related to a bicycle component, which is operable in at least a first state and a second state that differs from the first state. The electronic control unit is configured to control a first image capturing unit based on the information obtained by the reception unit.

In a second aspect of the controller according to the previous aspect, the bicycle component includes a bicycle shifting device, and the reception unit is configured to obtain information related to the bicycle shifting device.

In a third aspect of the controller according to any of the previous aspects, the bicycle component includes a bicycle suspension, and the reception unit is configured to obtain information related to the bicycle suspension.

In a fourth aspect of the controller according to any of the previous aspects, the bicycle component includes a bicycle adjustable seatpost, and the reception unit is configured to obtain information related to the bicycle adjustable bicycle seatpost.

In a fifth aspect of the controller according to any of the previous aspects, the bicycle component includes a bicycle electric power assist unit, and the reception unit is configured to obtain information related to the bicycle electric power assist unit.

In a sixth aspect of the controller according to any of the previous aspects, the reception unit is further configured to obtain at least one of information related to a bicycle riding state of a bicycle and information related to a bicycle riding environment of the bicycle.

In a seventh aspect of the controller according to any of the previous aspects, the reception unit obtains at least one of cadence of the bicycle, human power that is input to the bicycle, a rotation speed of a wheel of the bicycle, pressure applied to the bicycle, a pressure applied to the bicycle component, an inclination of the bicycle, and a geographical position of the bicycle.

In an eighth aspect of the controller according to any of the previous aspects, the reception unit is further configured to obtain information related to a rider of a bicycle.

In a ninth aspect of the controller according to any of the previous aspects, the reception unit obtains at least one of a heart rate of the rider, a temperature of the rider, a perspiration amount of the rider, and movement of the rider.

In a tenth aspect of the controller according to any of the previous aspects, the electronic control unit is configured to switch an operation mode of the first image capturing unit to an image capturing mode that captures an image upon determining the information obtained by the reception unit satisfies at least one image capturing start condition.

In an eleventh aspect of the controller according to any of the previous aspects, when the information obtained by the reception unit satisfies at least one image capturing stop condition, the electronic control unit is configured to switch an operation mode of the first image capturing unit to a stop mode that stops capturing an image upon determining the information obtained by the reception unit satisfies at least one image capturing stop condition.

In a twelfth aspect of the controller for according to any of the previous aspects, the electronic control unit is configured to receive an input for changing the image capturing start condition and configured to change the image capturing start condition based on the received input.

In a thirteenth aspect of the controller according to any of the previous aspects, the electronic control unit configured to receive an input for changing the image capturing stop condition and configured to change the image capturing stop condition based on the received input.

In a fourteenth aspect of the controller according to any of the previous aspects, the electronic control unit is configured to determine whether or not to record an image captured by the first image capturing unit to a recording medium based on the information obtained by the reception unit.

In a fifteenth aspect of the controller according to any of the previous aspects, the electronic control unit is configured to determine from the information obtained by the reception unit whether or not to enable an image stabilization process performed by one of the control unit and the first image capturing unit.

In a sixteenth aspect of the controller according to any of the previous aspects, the electronic control unit is configured to determine whether or not to change an angle of view of the first image capturing unit based on the information obtained by the reception unit.

In a seventeenth aspect of the controller according to any of the previous aspects, the electronic control unit is configured to control a second image capturing unit based on the information obtained by the reception unit and configured to combine an image captured by the first image capturing unit with an image captured by the second image capturing unit.

In an eighteenth aspect of the controller according to any of the previous aspects, the reception unit obtains information through wired communication or wireless communication.

A nineteenth aspect of the present invention is a controller for a bicycle image capturing device that includes a reception unit and an electronic control unit. The reception unit is configured to obtain information related to human power that is input to a bicycle. The electronic control unit is configured to control a first image capturing unit based on the information obtained by the reception unit.

A twentieth aspect of the present invention is a controller for a bicycle image capturing device that is used with a bicycle including a bicycle component. The controller includes an interface and a processor. The interface is configured to communicate with the bicycle component through a wired data link or a wireless data link to receive one or more data sets related to the bicycle component. The bicycle component is operable in at least a first state and a second state that differs from the first state. The processor is directly or indirectly connected to the interface and a first image capturing unit of the bicycle image capturing device. The processor is configured to control the first image capturing unit in accordance with the one or more data sets.

A twenty-first aspect of the present invention is a bicycle image capturing device that includes the controller according to any of the previous aspects.

The present invention provides a rider with a bicycle image capturing device that reduces annoying operations for changing an operation state and a controller for the bicycle image capturing device.

DESCRIPTION OF THE EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
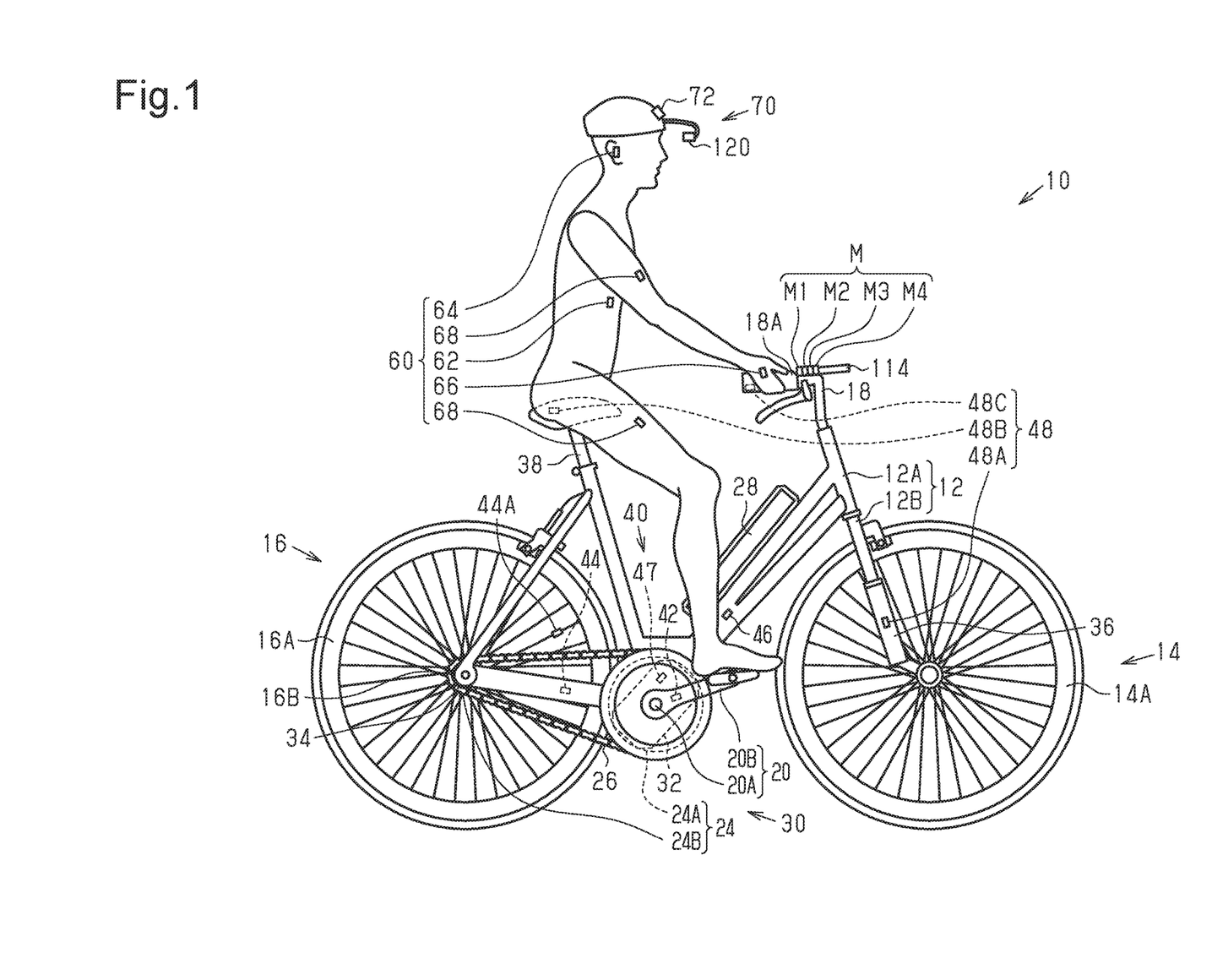
FIG. 1 is a side elevational view of a bicycle to which one embodiment of a bicycle image capturing device is installed.

As shown in FIG. 1, an electric assist bicycle (hereafter, referred to as "bicycle 10") includes a bicycle body 12, a front wheel 14, a rear wheel 16, a handlebar 18, a crank 20, a sprocket 24, a chain 26, a bicycle battery 28, a bicycle component (hereafter, referred to as "component 30"), a bicycle sensor 40, a rider sensor 60 and a bicycle image capturing device (hereafter, referred to as "image capturing device 70"). The bicycle body 12 includes a frame 12A and a front fork 12B.

The front wheel 14 includes a wheel 14A. The rear wheel 16 includes a wheel 16A and a hub 16B. The front wheel 14 and the rear wheel 16 are supported by the frame 12A and rotational relative to the frame 12A. The handlebar 18 includes a grip 18A. The handlebar 18 is supported by the frame 12A and configured to change a frontward direction of the front wheel 14.

The crank 20 includes a crank axle 20A, a right crank 20B and a left crank (not shown). The crank axle 20A is supported by the frame 12A such that the crank axle 20A is rotatable relative to the frame 12A. The right crank 20B and the left crank are coupled to the crank axle 20A. The sprocket 24 includes a front sprocket 24A and a rear sprocket 24B. The front sprocket 24A is coupled to the right crank 20B. The rear sprocket 24B is coupled to the wheel 16A of the rear wheel 16. The chain 26 runs around the front sprocket 24A and the rear sprocket 24B.

The rider applies human power to the crank 20 to rotate the crank 20. The human power includes driving power of the bicycle 10 and torque of the crank 20. The rotation of the crank 20 rotates the front sprocket 24A. The chain 26 transmits the rotation of the front sprocket 24A to the rear sprocket 24B to rotate the rear sprocket 24B and the wheel 16A of the rear wheel 16.

The bicycle battery 28 is coupled to the frame 12A to supply electric power to the component 30. The component 30 includes an electric power assist unit 32, a shifting device 34, a suspension 36, an adjustable seatpost 38, and an operation unit M. The operation unit M includes a first operation portion M1, a second operation portion M2, a third operation portion M3, and a fourth operation portion M4. The component 30 is operable in at least a first state and a second state, which differs from the first state. The state of the component 30 is switched when the operation unit M is operated.

The first operation portion M1 is an interface for operating the electric power assist unit 32 and directly or indirectly coupled to the handlebar 18. The electric power assist unit 32 and the first operation portion M1 can establish a data link through wired communication or wireless communication. When the data link is wired communication, the electric power assist unit 32 and the first operation portion M1 each includes an input-output port (not shown). The bicycle 10 includes a communication line (not shown) that connects the input-output port of the electric power assist unit 32 and the input-output port of the first operation portion M1. When the data link is wireless communication, the electric power assist unit 32 and the first operation portion M1 each include a transmission-reception circuit. The electric power assist unit 32 and the first operation portion M1 transmit and receive data sets to and from each other through the established data link. One example of the data sets is information that indicates the state of the electric power assist unit 32 and information for controlling the electric power assist unit 32.

The second operation portion M2 is an interface for operating the shifting device 34 and directly or indirectly coupled to the handlebar 18. The shifting device 34 and the second operation portion M2 are configured to establish a data link to transmit and receive data sets to and from each other. The data link and the hardware for realizing the data link are the same as those of the electric power assist unit 32 and the first operation portion M1.

The third operation portion M3 is an interface for operating the suspension 36 and directly or indirectly coupled to the handlebar 18. The suspension 36 and the third operation portion M3 are configured to establish a data link to transmit and receive data sets to and from each other. The data link and the hardware for realizing the data link are the same as those of the electric power assist unit 32 and the first operation portion M1.

The fourth operation portion M4 is an interface for operating the adjustable seatpost 38 and directly or indirectly coupled to the handlebar 18. The adjustable seatpost 38 and the fourth operation portion M4 are configured to establish a data link to transmit and receive data sets to and from each other. The data link and the hardware for realizing the data link are the same as those of the electric power assist unit 32 and the first operation portion M1.

The electric power assist unit 32 includes an assist motor (not shown). The assist motor assists rotation of the crank 20. One example of the assist motor is an electric motor. The assist motor produces rotation that is transmitted to the front sprocket 24A through a reduction gear (not shown). In one example, a one-way clutch can be arranged between the assist motor and the front sprocket 24A. The one-way clutch is arranged to avoid situations in which the torque input to the crank 20 is transmitted to the assist motor.

The electric power assist unit 32 includes multiple modes. In one example, the multiple modes include a normal mode and an ECO mode. The first operation portion M1 is operated to switch the mode of the electric power assist unit 32. When the first operation portion M1 is operated to select the normal mode, the upper limit of the output of the assist motor becomes higher than that when the ECO mode is selected. When the first operation portion M1 is operated to select the ECO mode, the upper limit of the output of the assist motor becomes less than that when the normal mode is selected.

The shifting device 34, which is a hub gear located in the hub 16B of the rear wheel 16, changes the speed of rotation received by the rear sprocket 24B and transmits the rotation to the wheel 16A. The shifting device 34 incorporates a planetary gear mechanism (not shown) including gears (not shown). The engagement state of the gears is changed by a cable (not shown), which transmits manual power of the rider, or an electrically driven actuator (not shown). When the rider inputs a shift-up instruction to the second operation portion M2, the shifting device 34 changes the gear to increase the gear ratio of the bicycle 10. When the rider inputs a shift-down instruction to the second operation portion M2, the shifting device 34 changes the gear to decrease the gear ratio of the bicycle 10. The shifting device 34 is not limited to a hub gear and can be a derailleur or a gearbox. When the shifting device 34 is a derailleur, at least one of the front sprocket 24A and the rear sprocket 24B includes a plurality of sprockets 24 having different diameters. The shifting device 34 changes the gear ratio of the bicycle 10 by changing the sprocket 24 around which the chain 26 runs. The shifting device 34 can change the gear ratio between two or more gear ratios. Thus, the shifting device 34 constitutes a gear ratio changing device.

The suspension 36 is a front suspension that is installed on the front fork 12B and supports the front wheel 14 so that the position of the front wheel 14 is changeable relative to the front fork 12B. The suspension 36 includes an elastic body (not shown) to convert an impact applied to the front wheel 14 into elastic energy and absorb the impact. The elastic body is, for example, a cylinder that encloses a spring, air, oil, and a fluid including a magnetic fluid or the like. The state of the elastic body, which is incorporated in the suspension 36, is changed by a cable (not shown), which transmits manual power of the rider, or an electrically driven actuator (not shown). When the rider inputs a lockout instruction to the third operation portion M3, the suspension 36 supports the front wheel 14 in a manner that disables changes in the position of the front wheel 14 relative to the front fork 12B. When the rider inputs an open instruction to the third operation portion M3, the suspension 36 supports the front wheel 14 in a manner that allows for changes in the position of the front wheel 14 relative to the front fork 12B. When the rider inputs a damping ratio increase instruction to the third operation portion M3, the suspension 36 is set to a high damping ratio for an impact applied to the front wheel 14. When the rider inputs a damping ratio decrease instruction to the third operation portion M3, the suspension 36 is set to a low damping ratio. When the rider inputs a long stroke instruction to the third operation portion M3, the stroke of the suspension 36 is set to be long. When the rider inputs a short stroke instruction to the third operation portion M3, the stroke of the suspension 36 is set to be short. The rear suspension 36 can be a rear suspension. In this case, the suspension 36 is set in the vicinity of the rear wheel 16. The operations performed on the front wheel 14 are performed on the rear wheel 16 in the same manner. The suspension 36 can include one of the front suspension and the rear suspension or both. Further, the suspension 36 can change the damping ratio between two or more damping ratios.

The adjustable seatpost 38 is coupled to the frame 12A so that the position of the adjustable seatpost 38 is changeable relative to the frame 12A. The adjustable seatpost 38 is partially inserted into the frame 12A. The position of the adjustable seatpost 38 is changed relative to the frame 12A by a cable (not shown), which transmits manual power of the rider, or an electrically driven actuator (not shown). When the rider inputs a lifting instruction to the fourth operation portion M4, the adjustable seatpost 38 is lifted relative to the frame 12A. When the rider inputs a lowering instruction to the fourth operation portion M4, the adjustable seatpost 38 is lowered relative to the frame 12A. The rider can set the adjustable seatpost 38 to at least two different positions.

The bicycle sensor 40 includes a cadence sensor 42, an angular rate sensor 44, an inclination sensor 46, a position sensor 47, a pressure sensor 48 and a human power sensor 50. The human power sensor 50 includes a torque sensor 52 and a power meter 54.

The cadence sensor 42 is coupled to the right crank 20B or the left crank to measure the number of rotations (hereafter, referred to as "cadence") of the crank axle 20A per minute. In one example, the cadence sensor 42 detects a magnet coupled to the crank 20 to measure cadence.

The angular rate sensor 44 is coupled to one of the frame 12A and the electric power assist unit 32 to detect the rotation speed of the wheel 16A by detecting a magnet 44A located on the rear wheel 16. The vehicle speed of the bicycle 10 is calculated from the rotation speed of the wheel 16A and the circumferential length of the rear wheel 16. The magnet 44A can be coupled to the front wheel 14. In this case, the angular rate sensor 44 detects the rotation speed of the wheel 14A of the front wheel 14 to calculate the vehicle speed of the bicycle 10.

The inclination sensor 46 is arranged on one of the frame 12A and the electric power assist unit 32 to detect a pitch angle of the frame 12A. The pitch angle is a rotation angle about a predetermined pitch axis that extends in the lateral direction of the bicycle 10. In one example, the inclination sensor 46 is configured to detect the angular rate of the pitch angle and calculates a value by integrating the angular rate around the pitch axis as the pitch angle.

The position sensor 47 is coupled to one of the frame 12A and the electric power assist unit 32 to detect the present position of the bicycle 10. In one example, the position sensor 47 includes a global positioning system (GPS) communication device. The position sensor 47 receives radio waves from a satellite to detect the present position of the bicycle 10. Additionally, the position sensor 47 can include a communication device that uses infrared light.

The pressure sensor 48 measures pressure applied to the bicycle 10 or the component 30. The pressure sensor 48 includes a suspension pressure sensor 48A, a seatpost pressure sensor 48B, and a handlebar pressure sensor 48C. The suspension pressure sensor 48A is arranged on the suspension 36, which is a portion of the component 30, to measure the magnitude of an impact that is received by the suspension 36 from a road surface. The seatpost pressure sensor 48B is arranged on the adjustable seatpost 38, which is a portion of the component 30, to measure pressure applied to the adjustable seatpost 38 when the rider is seated. The handlebar pressure sensor 48C is arranged on the grip 18A, which is a portion of the bicycle 10, of the handlebar 18 to measure the strength of the rider for holding the grip 18A.

The human power sensor 50, which includes the torque sensor 52 and the power meter 54, detects human power that is input to the bicycle 10. The torque sensor 52 detects torque applied to the crank 20. The torque sensor 52 can be arranged on any one of the crank axle 20A, a driving path that extends from the crank axle 20A to the front sprocket 24A, the front sprocket 24A, the right crank 20B, and the left crank. The torque sensor 52, which can be actualized by a strain sensor, a magnetostriction sensor, an optical sensor, or the like, only needs to output a signal corresponding to the torque applied to the crank 20.

The power meter 54 measures driving power applied to the bicycle 10. The driving power can be calculated by the product of the torque and the rotation speed of the crank axle 20A. In one example, the power meter 54 includes a sensor that detects the rotation speed of the chain 26 when the front sprocket 24A is rotating and a sensor that measures the number of oscillations of the chain 26 when the front sprocket 24A is rotating. The tension of the chain 26 is calculated based on the number of oscillations of the chain 26. The driving power is calculated by the product of the tension of the chain 26 and the rotation speed of the chain 26. The power meter 54 can be arranged on the crank axle 20A and the hub 16B of the rear wheel 16.

The rider sensor 60 is attached to the body of the rider to obtain information of the rider. The rider sensor 60 includes a heart rate meter 62, a thermometer 64, a perspiration meter 66, and a motion sensor 68. The heart rate meter 62 measures the heart rate of the rider. The thermometer 64 measures the temperature of the rider. The perspiration meter 66 measures the perspiration of the rider. The motion sensor 68 measures movement of the rider.

In one example, the heart rate meter 62 is attached to the chest of the rider to measure an electrocardiogram of the rider. The heart rate meter 62 detects the heart rate from changes in the electrocardiogram and calculates the number of heartbeats from intervals of the heart rate. The heart rate meter 62 can be attached to the wrist of the rider and calculate the number of heartbeats by detecting pulse waves of the rider.

In one example, the thermometer 64 is attached to the ear of the rider to detect infrared light radiated from the body surface of the rider. The thermometer 64 calculates the temperature of the rider based on the intensity of the radiated infrared light. The thermometer 64 only needs to measure the temperature of the rider and can be, for example, a thermistor, the resistance of which changes depending on heat.

In one example, the perspiration meter 66 is attached to the hand of the rider and includes a moisture sensor that detects moisture secreted from the body surface of the rider. The perspiration meter 66 calculates the perspiration amount of the rider based on the moisture detected by the moisture sensor.

In one example, the motion sensor 68 is attached to the arm or the leg of the rider and includes a three-axis acceleration sensor that detects the acceleration of the arm or the leg of the rider. The motion sensor 68 calculates the movement amount of the rider based on the acceleration detected by the three-axis acceleration sensor.

Figure 2:
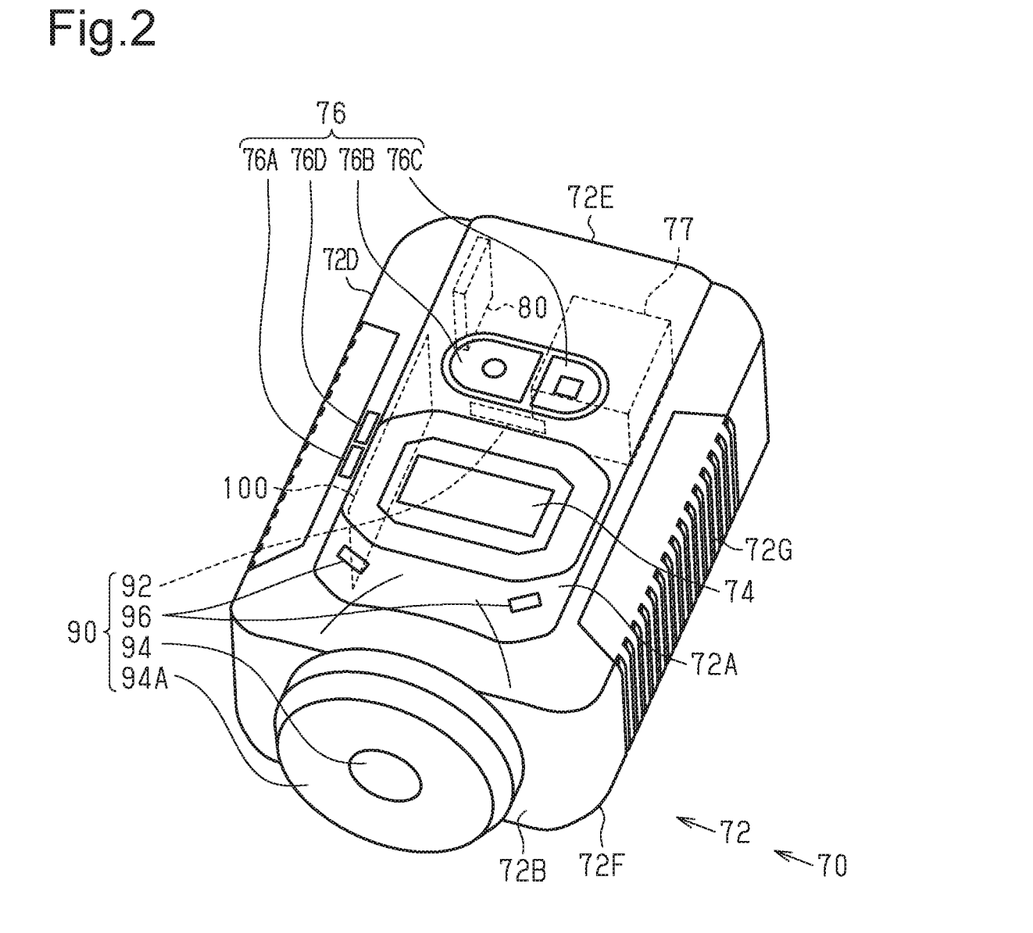
FIG. 2 is a perspective view of the bicycle image capturing device illustrated in FIG. 1.

The structure of the image capturing device 70 will now be described with reference to FIGS. 2 and 3. The image capturing device 70 includes a housing 72, a display unit 74, a button 76, a battery 77, a bus 78, a recording medium 80, an image capturing unit 90 and a controller 100. The button 76 includes a power button 76A, an image capturing button 76B, a stop button 76C, and a setting button 76D. The image capturing unit 90 includes an image capturing controller 92, a lens 94, a lens protector 94A, and a microphone 96. The controller 100 includes a reception unit 102, an electronic control unit 104 (hereafter, referred to as "control unit 104") and a recording interface 106. The reception unit 102 includes a Wi-Fi interface 102A, an ANT+ interface 102B, and a cable interface 102C.

The housing 72 accommodates each element of the image capturing device 70. The housing 72 includes an upper surface 72A on which the display unit 74, the power button 76A, the image capturing button 76B, the stop button 76C, the setting button 76D, and the microphone 96 are located. The display unit 74 includes a liquid crystal display to show information related to the state of the image capturing device 70 on the liquid crystal display. The image capturing device 70 is used in multiple switchable states. The multiple states include at least a power on mode and a power off mode. The power on mode includes at least a setting mode, an image capturing mode, and a stop mode. The setting mode sets the state of each of different items including an item related to the image capturing performed by the image capturing device 70. The image capturing mode captures images. The stop mode stops capturing images.

The power button 76A functions to switch the state of the image capturing device 70. In one example, if the power button 76A is pressed for a long time when the image capturing device 70 is in the power off mode, the display unit 74 is illuminated and the image capturing device 70 is switched to the power on mode. If the power button 76A is pressed for a long time when the image capturing device 70 is in the power on mode, the display unit 74 is deactivated and the image capturing device 70 is switched to the power off mode.

In the power on mode, the image capturing button 76B functions to switch the valid mode from one of the setting mode and the stop mode to the image capturing mode. In one example, if the image capturing button 76B is pressed when one of the setting mode and the stop mode is valid, a mark on the display unit 74 is illuminated to indicate the image capturing mode, and the valid mode is switched to the image capturing mode. Consequently, the image capturing device 70 captures images. In the power on mode, the stop button 76C functions to switch the valid mode to the stop mode from one of the setting mode and the image capturing mode. In one example, if the stop button 76C is pressed when one of the setting mode and the image capturing mode is valid, a mark on the display unit 74 is illuminated to indicate the stop mode and the valid mode is switched to the stop mode. Consequently, the image capturing device 70 will not capture images.

In the power on mode, the setting button 76D functions to switch the valid mode to the setting mode from one of the image capturing mode and the stop mode or to the stop mode from the setting mode. In one example, if the setting button 76D is pressed when one of the image capturing mode and the stop mode is valid, a mark on the display unit 74 is illuminated to indicate the setting mode and the valid mode is switched to the setting mode. The items that can be set in the setting mode are, for example, connection between the image capturing device 70 and the component 30, the circumferential length of a tire, time, the number of pixels in an image, and sensitivity.

The microphone 96 collects sound around the image capturing device 70 and converts the sound into electric signals. In one example, two microphones 96 are arranged on the upper surface 72A of the housing 72 separated from each other by some tens of millimeters to be configured to record stereo sound when collecting the sound around the image capturing device 70.

The housing 72 includes a front surface 72B on which the lens 94 is located. The lens 94 functions to draw light into the housing 72 from the front of the housing 72. The lens protector 94A covers the front of the lens 94 to protect the lens 94. In one example, the lens protector 94A is flat and formed from a transparent resin. The lens protector 94A can include a central portion that projects frontward.

The housing 72 includes a right side surface 72C and a left side surface 72D, each of which includes, for example, corrugated plate-shaped projections 72G. The projections 72G, which allow the rider to easily hold the housing 72, produce an effect for limiting situations in which the rider drops the image capturing device 70.

The housing 72 includes a rear surface 72E, which includes an opening provided with a cover (neither shown). The battery 77 and the recording medium 80 are inserted into the opening when the cover is removed. The battery 77 is a power supply for operating the image capturing device 70. The battery 77 is, for example, a lithium-ion battery. The recording medium 80 is a nonvolatile memory that records images received through the lens 94, sound collected by the microphone 96, and information needed for the operation. The recording medium 80 is, for example, a card-type memory device.

The housing 72 includes a lower surface 72F, which includes a fastening bore (not shown). The fastening bore is internally threaded. Engagement of the fastening bore with an external thread of an external fastener (not shown) fastens the housing 72. The helmet of the rider, the handlebar 18 of the bicycle 10, and the like include the external fasteners. In this manner, the image capturing device 70 is coupled to the head of the rider, the handlebar 18, and the like.

A remote controller 112 and a smartphone 114 function to perform the setting of the image capturing device 70 and operate the image capturing device 70. The rider can operate the remote controller 112 or the touchscreen of the smartphone 114 to input information needed for operating the image capturing device 70.

A second image capturing unit 120 includes a lens, a microphone, and a communication interface and functions to transmit a captured image to the image capturing device 70. The second image capturing unit 120 is located on, for example, the helmet of the rider, the handlebar 18, and at another location of the bicycle race event site to capture images of the rear of the bicycle 10, the expression of the rider, movement of the rider when operating the operation unit M, movement of the bicycle 10 as viewed from a distant point, and the like. The second image capturing unit 120 can be another image capturing device 70.

Figure 3:
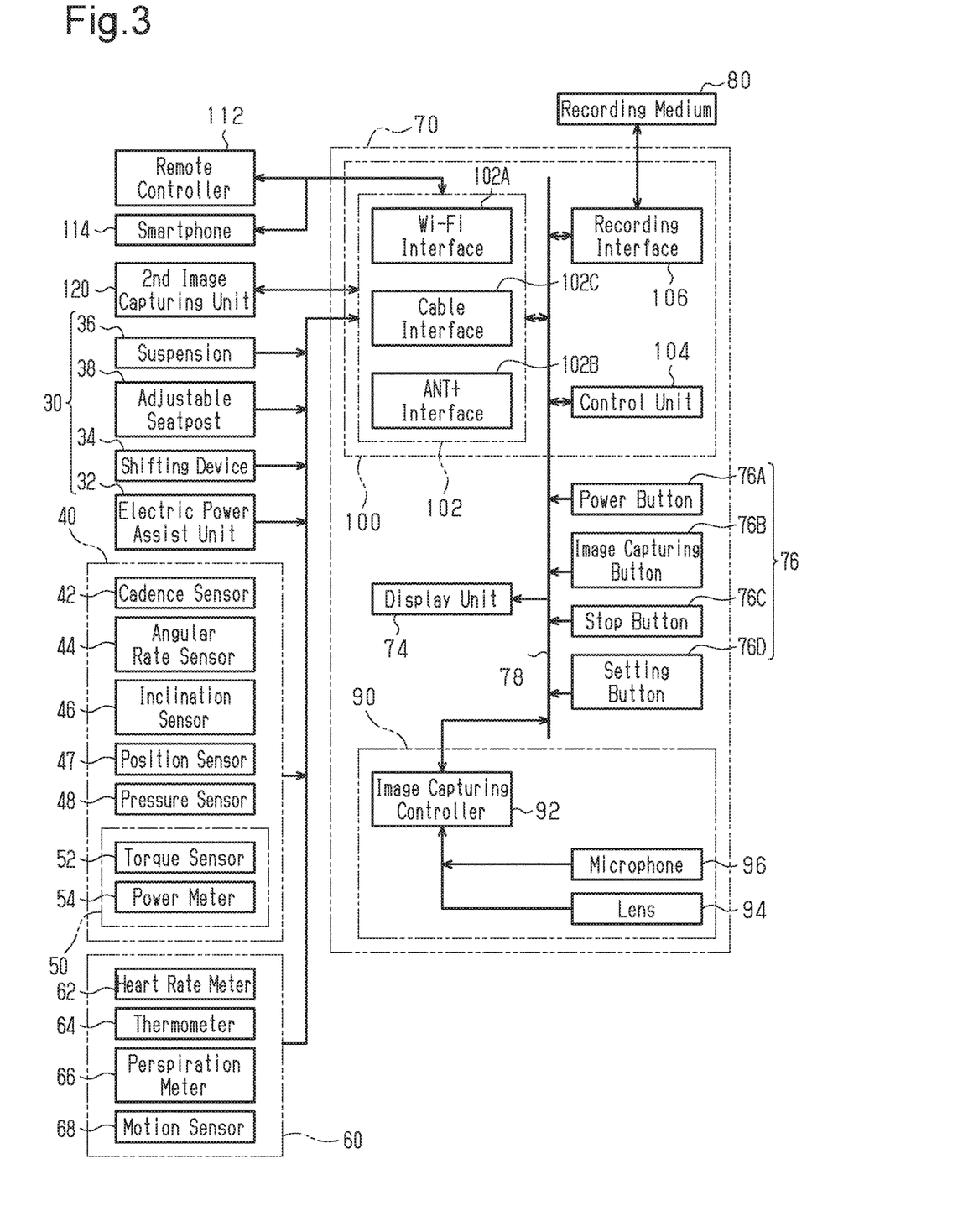
FIG. 3 is a block diagram showing the bicycle image capturing device illustrated in FIG. 1 and other devices.

As shown in FIG. 3, the image capturing device 70 includes the image capturing unit 90 and the controller 100. The controller 100 includes the reception unit 102, the control unit 104, and the recording interface 106. In one example, when the reception unit 102, the control unit 104, and the recording interface 106 are each a semiconductor chip, the controller 100 is a substrate that supports the semiconductor chips. In another example, when the controller 100 is a semiconductor chip, the reception unit 102, the control unit 104, and the recording interface 106 are each a module that occupies a portion of the semiconductor chip. The bus 78 electrically connects the display unit 74, the button 76, the image capturing unit 90, the control unit 104, and the recording interface 106. In one example, the bus 78 is a PCI-Express and transmits information among the connected elements.

The image capturing unit 90 functions to capture images of the front of the image capturing device 70 and surrounding sound using the lens 94 and the microphone 96. The image capturing controller 92 includes an image sensor to convert the light received by the lens 94 into electric signals. Then, the electric signals are converted into stationary image information. Alternatively, the electric signals and electric signals of the sound received by the microphone 96 are converted to moving image information. One example of the stationary image information is of a PEG type. One example of the moving image information is of an MPEG-4 type. The image capturing unit 90 transmits the stationary image information or the moving image information to the bus 78.

The reception unit 102 is an interface that is configured to establish data links with the electric power assist unit 32, the shifting device 34, the suspension 36, the adjustable seatpost 38, and the bicycle sensor 40, the rider sensor 60, the remote controller 112, the smartphone 114, and the second image capturing unit 120. The data links and the hardware for realizing the data links are the same as those of the electric power assist unit 32 and the first operation portion M1. The reception unit 102 receives one or more data sets from the above devices and transmits the data sets to the bus 78. The reception unit 102 receives information transmitted from the second image capturing unit 120 through wireless communication or wired communication. The Wi-Fi interface 102A and the ANT+ interface 102B receive radio waves through Wi-Fi and ANT+, which are examples of wireless communication. The reception unit 102 can include a Bluetooth® interface. The cable interface 102C is connected to the component 30 by an electric cable to receive electric signals transmitted through the electric cable.

Information obtained by the reception unit 102 includes information related to the component 30 or information related to human power. The information related to the component 30 includes information related to the electric power assist unit 32, information related to the shifting device 34, information related to the suspension 36, and information related to the adjustable seatpost 38. The information obtained by the reception unit 102 can further include at least one of information related to the riding state of the bicycle 10, information related to the riding environment of the bicycle 10, and information related to the rider. The information related to the riding state of the bicycle 10 includes at least one of cadence of the bicycle 10, human power that is input to the bicycle 10, the rotation speed of the wheel 14A of the front wheel 14 and the wheel 16A of the rear wheel 16, the inclination of the bicycle 10, pressure applied to the bicycle 10, and pressure applied to the component 30. The information related to the riding environment of the bicycle 10 includes a geographical position of the bicycle 10. The information related to the rider includes at least one of the heart rate of the rider, the temperature of the rider, perspiration of the rider, and movement of the rider.

The reception unit 102 is also configured to transmit information to the smartphone 114 and the second image capturing unit 120. This, for example, enables an image to be displayed on the screen of the smartphone 114 and the operation of the second image capturing unit 120 to be controlled.

The control unit 104 functions to receive information, which was obtained by the reception unit 102, from the bus 78 and control the image capturing unit 90 and the recording interface 106 based on the information. The control unit 104 further functions to receive information of images captured by the image capturing unit 90 and information needed for the image capturing from the recording interface 106. In one example, the control unit 104 includes a processor, and has an image processing function in addition to the above control. The image processing function includes, for example, an image stabilization function, a view angle change function, and a function for combining multiple images. The image stabilization function and the view angle change function can be realized by hardware instead of software that is executed by the processor. The means for connecting the control unit 104, the reception unit 102, and a first image capturing unit is not limited to the bus 78. The control unit 104, the reception unit 102, and the first image capturing unit can be directly connected to one another through wireless or wired communication or indirectly connected to one another by another interface or another element.

The recording interface 106 functions to record images captured by the image capturing device 70. In one example, the recording interface 106 includes a connector connectable to the recording medium 80 to record information, which is received from the bus 78, to the recording medium 80 through an electromagnetic process. Such recording is not limited to the recording to the recording medium 80 and can be communication of the image capturing device 70 with an external device. For example, the reception unit 102 can transmit image information to the external device from the image capturing device 70.

Figure 4:
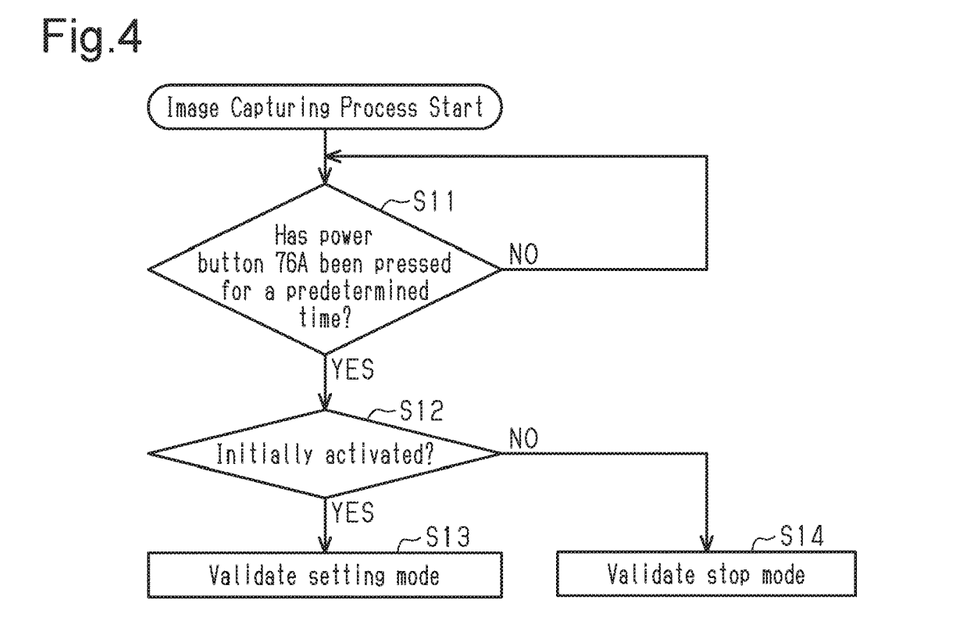
FIG. 4 is a flowchart showing one example of an image capturing process executed by the bicycle image capturing device illustrated in FIG. 1.
Figure 5:
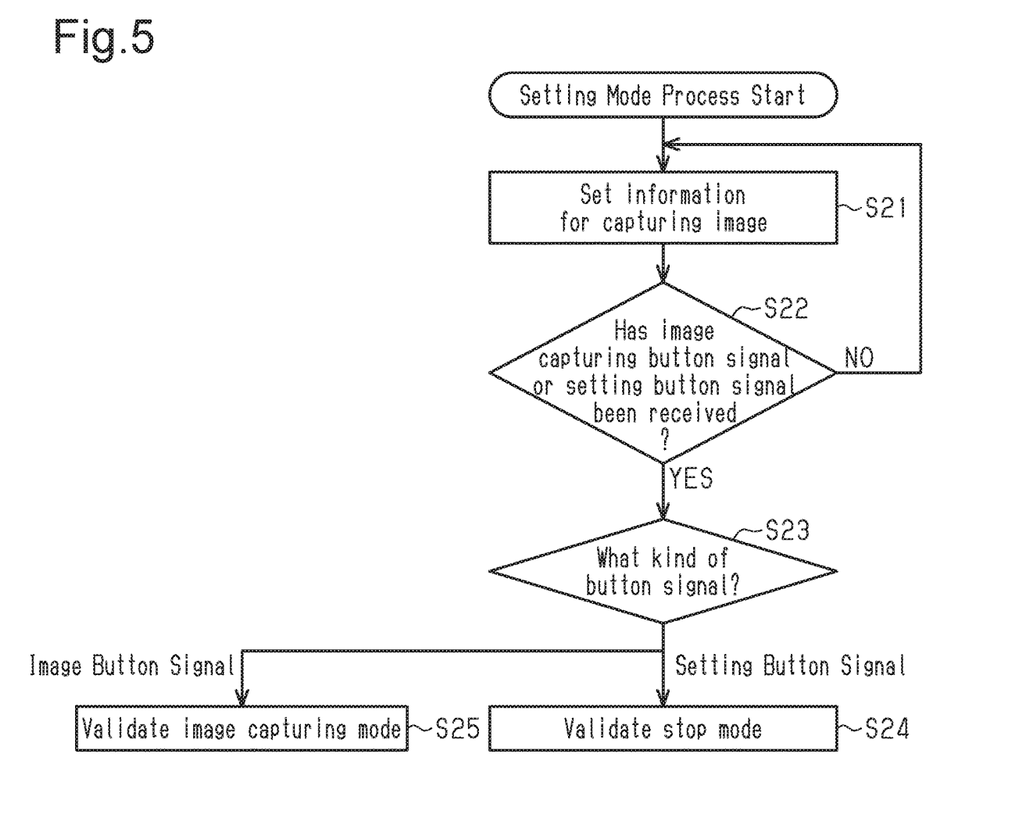
FIG. 5 is a flowchart showing one example of a setting mode process executed by the bicycle image capturing device illustrated in FIG. 1.
Figure 6:
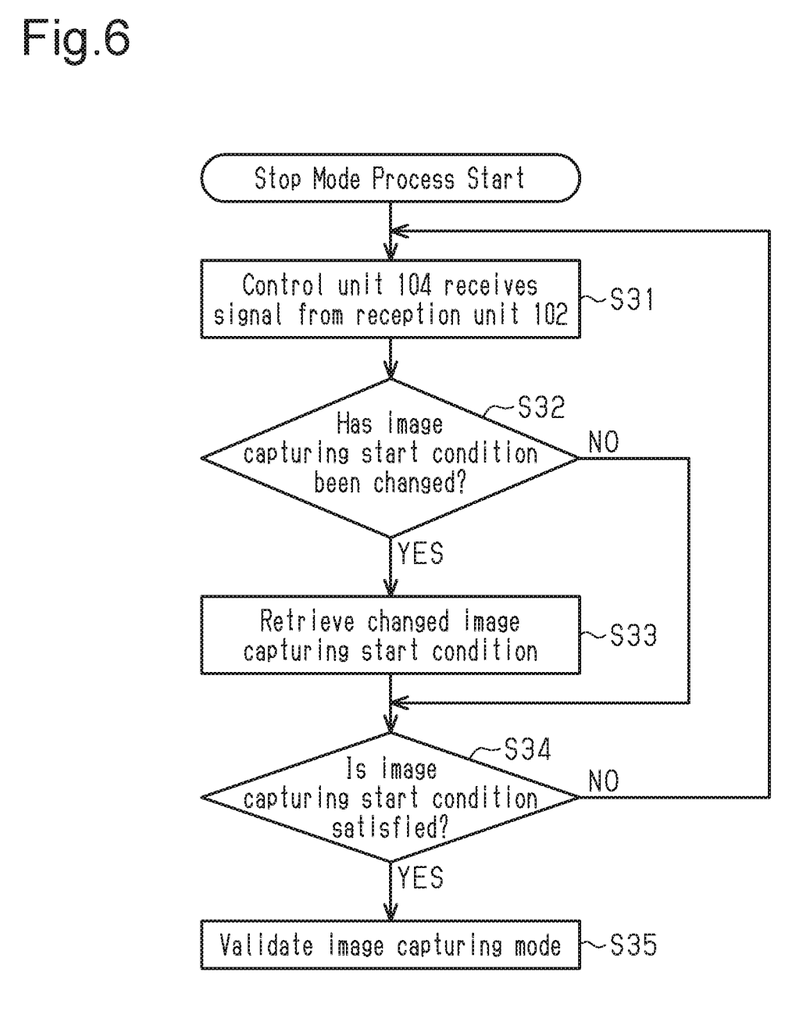
FIG. 6 is a flowchart showing one example of a stop mode process executed by the bicycle image capturing device illustrated in FIG. 1.
Figure 7:
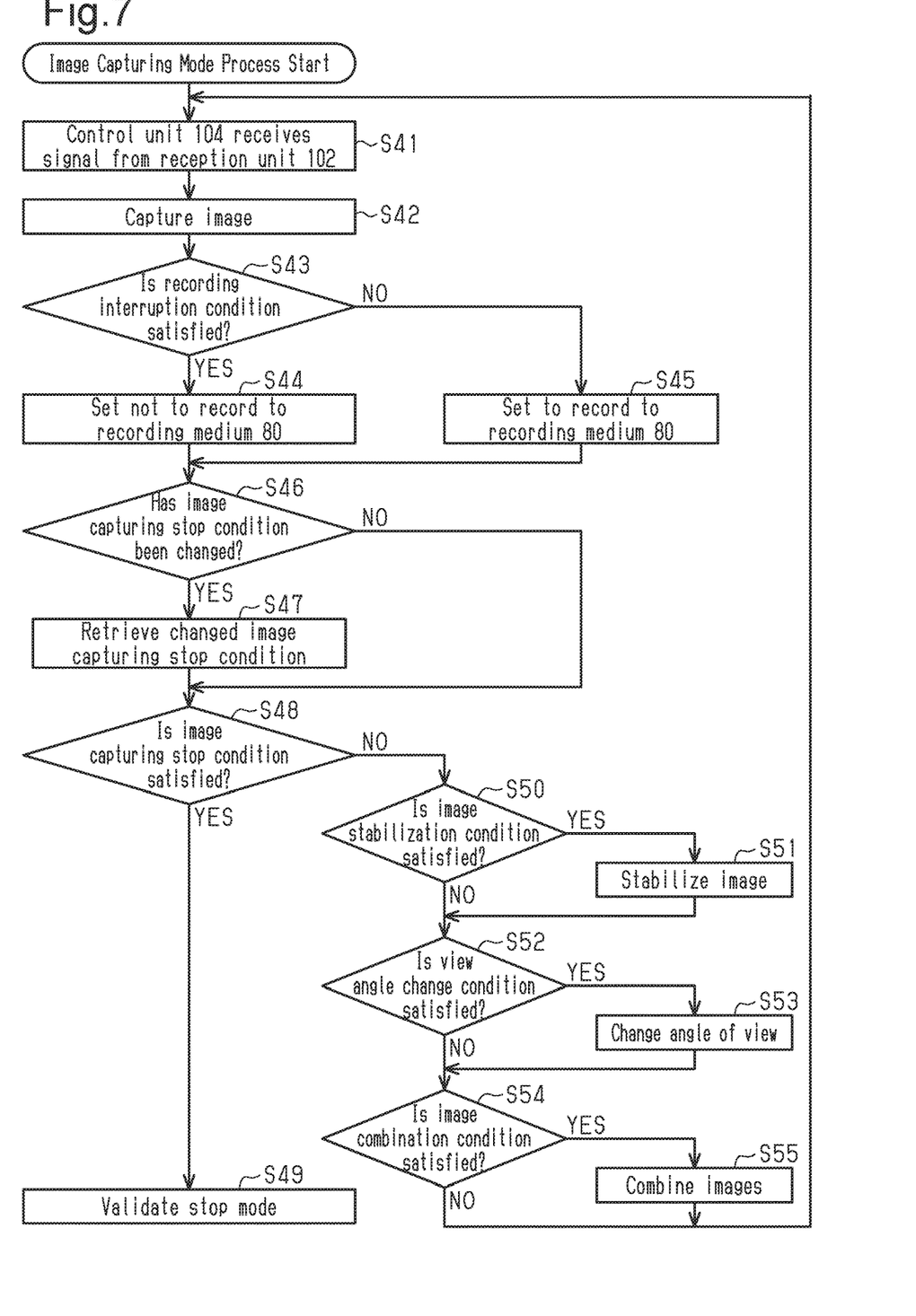
FIG. 7 is a flowchart showing one example of an image capturing mode process executed by the bicycle image capturing device illustrated in FIG. 1.
Figure 8:
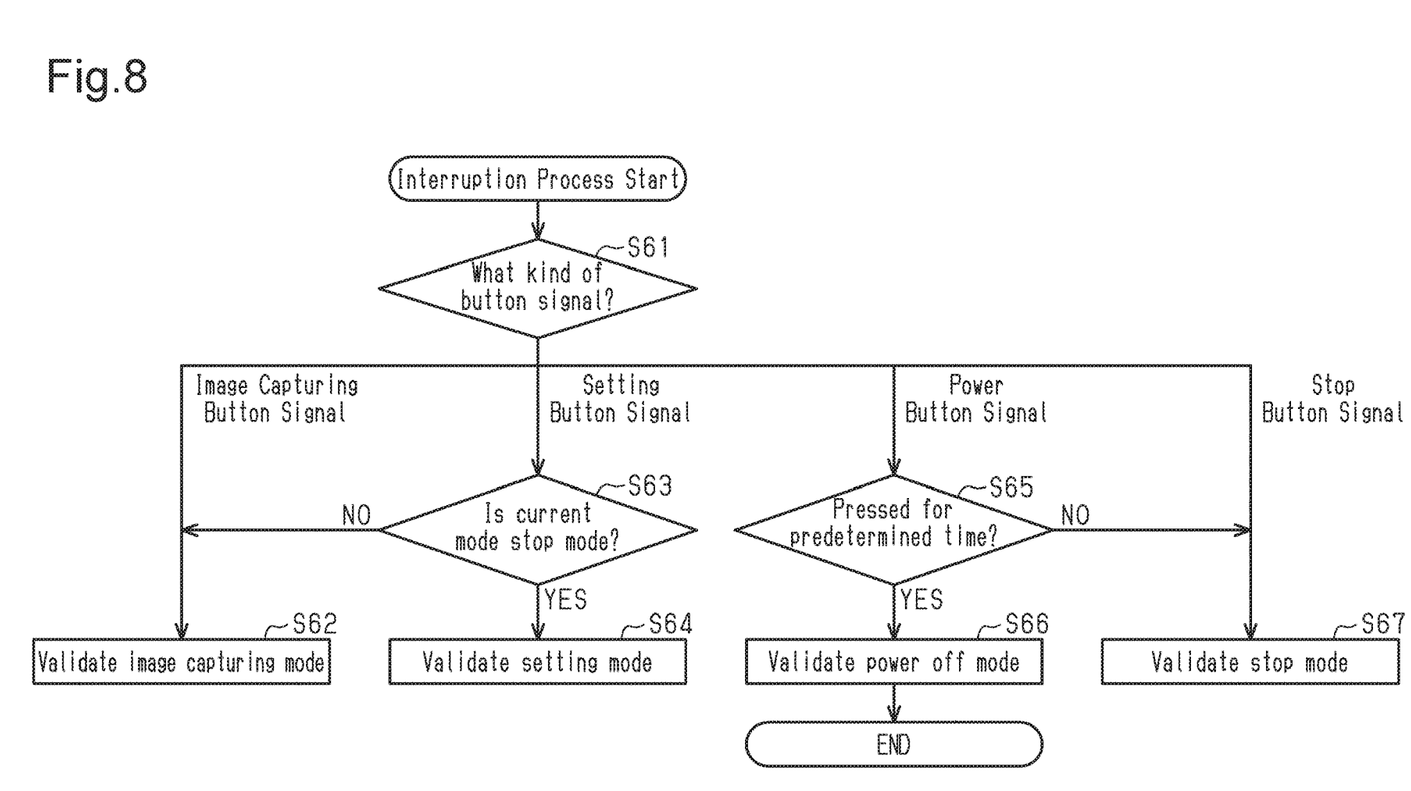
FIG. 8 is a flowchart showing one example of an interruption process executed by the bicycle image capturing device illustrated in FIG. 1.

One example of control performed by the controller 100 will now be described with reference to FIGS. 4 to 8. FIG. 4 shows an image capturing process executed by the controller 100. The condition for starting the image capturing process is when the controller 100 is switched to the power on mode from the power off mode. FIG. 5 shows a setting mode process executed by the controller 100. The condition for starting the setting mode process is when step S12 of FIG. 4 or step S64 of FIG. 8 is performed, FIG. 6 shows a stop mode process executed by the controller 100. The condition for starting the stop mode process is when step S24 of FIG. 5, step S49 of FIG. 7, or step S67 of FIG. 8 is performed. FIG. 7 shows an image capturing mode process executed by the controller 100. The condition for starting the image capturing mode process is when step S25 of FIG. 5, step S35 of FIG. 6, or step S62 of FIG. 8 is performed. FIG. 8 shows an interruption process executed by the controller 100. The condition for starting the interruption process is when the stop mode process of FIG. 6 or the image capturing mode process of FIG. 7 is started.

In step S11 of the image capturing process shown in FIG. 4, the control unit 104 determines whether or not the power button 76A has been pressed for a predetermined time. One example of the predetermined time is 0.5 seconds. When the determination is affirmative, the control unit 104 determines that the image capturing device 70 is in the power on mode and performs step S12. When the determination is negative; the control unit 104 determines that the image capturing device 70 is in the power off mode and again performs step S11.

In step S12, the control unit 104 determines whether or not the activation is performed for the first time. More specifically, the control unit 104 determines whether or not information for capturing images is recorded to the recording medium 80. When the determination is affirmative, the control unit 104 determines that the activation is performed for the first time and performs step S13. When the determination is negative; the control unit 104 does not determine that the activation is performed for the first time and performs step S14.

In step S13, the control unit 104 electrically connects the image capturing unit 90, the reception unit 102, and the recording interface 106 to the battery 77 and sets the setting mode to the valid mode. This starts the setting mode process of FIG. 5.

In step S14, the control unit 104 electrically connects the image capturing unit 90, the reception unit 102, and the recording interface 106 to the battery 77 and sets the stop mode to the valid mode. This starts the stop mode process of FIG. 6.

In step S21 of the setting mode process shown in FIG. 5, when receiving a signal for setting the image capturing information from the remote controller 112, the smartphone 114, or the button 76, the control unit 104 changes the information in accordance with the content of the signal and records a flag, which indicates that the information has been changed, to the recording medium 80. The rider selects and determines each item with the power button and the stop button to change the above information. The image capturing information includes, for example, an image capturing start condition (refer to FIG. 6), an image capturing stop condition (refer to FIG. 7), a recording interruption condition (refer to FIG. 7), an image stabilization condition (refer to FIG. 7), a view angle change condition (refer to FIG. 7), and an image combination condition (refer to FIG. 7). Each item includes an initial value. Such information contributes to the setting of the image capturing condition in accordance with the purpose of use of the bicycle 10 such as touring or sprint.

The image capturing start condition is the condition for starting the image capturing performed by the image capturing unit 90. The rider can start to capture images at a further preferred timing by changing the image capturing start condition. The image capturing stop condition is the condition for stopping the image capturing performed by the image capturing unit 90. The rider can stop the image capturing at a further preferred timing by changing the image capturing stop condition. The recording interruption condition is the condition for interrupting recording of new information to the recording medium 80. The image stabilization condition is the condition for enabling the image stabilization function installed in the image capturing unit 90 or the image stabilization process performed by the control unit 104.

In step S22, the control unit 104 determines whether or not an image capturing button signal or a setting button signal has been received. When the determination is affirmative, the control unit 104 performs step S23. When the determination is negative, the control unit 104 performs step S21.

In step S23, the control unit 104 determines the kind of the button signal. When receiving a setting button signal from the setting button 76D of the image capturing device 70, the remote controller 112, or the smartphone 114, the control unit 104 performs step S24. When receiving an image capturing button signal from the image capturing button 76B of the image capturing device 70, the remote controller 112, or the smartphone 114, the control unit 104 performs step S25. In step S24, the control unit 104 sets the stop mode to the valid mode. This starts the stop mode process of FIG. 6. In step S25, the control unit 104 sets the image capturing mode to the valid mode. This starts the image capturing mode process of FIG. 7.

In step S31 of the stop mode process shown in FIG. 6, the control unit 104 receives information from the reception unit 102. When activated, each of the suspension 36, the adjustable seatpost 38, the shifting device 34, the bicycle sensor 40, and the rider sensor 60 continuously transmits signals to the reception unit 102. In the power on mode, the reception unit 102 receives the signals and continuously transmits the received signals to the bus 78. The control unit 104 receives the signals from the bus 78.

In step S32, the control unit 104 determines whether or not the image capturing start condition that was set in step S21 has been changed. The image capturing start condition is the condition for starting the image capturing performed by the image capturing unit 90. When the determination is affirmative, the control unit 104 performs step S33. When the determination is negative, the control unit 104 performs step S34.

In step S33, the control unit 104 retrieves the image capturing start condition that has been changed in step S21 from the recording medium 80 and uses the changed image capturing start condition in the following steps.

In step S34, the control unit 104 determines whether or not information obtained by the reception unit 102 satisfies the image capturing start condition. It is preferred that breathtaking images be captured for the rider and the viewers. In one example, the image capturing start condition is that the gear ratio of the shifting device 34 is maximal, the damping ratio of the suspension 36 is maximal, the adjustable seatpost 38 is located at the highest position, and the output of the assist motor of the electric power assist unit 32 is maximal. In another example, the image capturing start condition is determined based on cadence detected by the cadence sensor 42, driving force of the bicycle 10 detected by the power meter 54, a rotation speed of the wheel 16A detected by the angular rate sensor 44, a speed of the bicycle 10 calculated from the rotation speed of the wheel 16A, a pitch angle detected by the inclination sensor 46, a geographical position of the bicycle 10 detected by the position sensor 47, and pressure applied to the bicycle 10 or the component 30 detected by the pressure sensor 48. In a further example, the image capturing start condition is determined based on information related to the rider, for example, the heart rate of the rider detected by the heart rate meter 62, the temperature of the rider detected by the thermometer 64, perspiration of the rider detected by the perspiration meter 66, and movement of the rider detected by the motion sensor 68. At least one or a combination of the above conditions can be used as the image capturing start condition. When the determination is affirmative, the control unit 104 performs step S35. When the determination is negative, the control unit 104 performs step S31.

In step S35, the control unit 104 sets the image capturing device 70 to the image capturing mode. Then, the control unit 104 performs step S41.

In step S41, the control unit 104 receives information from the reception unit 102 through the bus 78. Step S41 and step S31 have the same operation.

In step S42, the control unit 104 transmits a signal to the image capturing controller 92 so that the image capturing controller 92 starts to capture images. When receiving the signal, the image capturing controller 92 converts images received through the lens 94 and sound collected by the microphone 96 into stationary image information or moving image information and transmits the information to the bus 78. The control unit 104 receives the stationary image information or the moving image information and transmits the information to the recording interface 106. The recording interface 106 records the stationary image information or the moving image information to the recording medium 80. The conversion of stationary image information or moving image information, which is performed by the image capturing controller 92, can be performed by the processor of the control unit 104.

In step S43, the control unit 104 determines whether or not the information obtained by the reception unit 102 satisfies the recording interruption condition obtained in step S21. The recording interruption condition is the condition for determining whether or not to record the images captured by the image capturing unit 90 to the recording medium 80. When the determination is affirmative, the control unit 104 performs step S44. When the determination is negative, the control unit 104 performs step S45.

When the rider wishes not to record images for a short period of time, the recording can be unable to restart immediately after the image capturing unit 90 stops capturing images. In this regard, the recording to the recording medium 80 is interrupted while the image capturing unit 90 continues to capture images. This ensures that images are recorded even when the rider stops recording images for a short period of time.

In step S44, the control unit 104 sets the recording interface 106 not to perform recording to the recording medium 80.

In step S45, the control unit 104 sets the recording interface 106 to perform recording to the recording medium 80.

In step S46, the control unit 104 determines whether or not the image capturing stop condition that was set in step S21 has been changed. The image capturing stop condition is the condition for stopping the image capturing performed by the image capturing unit 90. When the determination is affirmative, the control unit 104 performs step S47. When the determination is negative, the control unit 104 performs step S48.

In step S47, the control unit 104 retrieves the image capturing stop condition that has been changed in step S21 from the recording medium 80 and uses the changed image capturing stop condition in the following steps.

In step S48, the control unit 104 determines whether or not information obtained by the reception unit 102 satisfies the image capturing stop condition. It is preferred that the image capturing unit 90 stop capturing images when the situation is not suitable for the image capturing. For example, when uploading a recorded image to a social network, there is a limit to the file size. Also, power consumed during the image capturing and the capacity of the recording medium 80 can be factors. The condition for stopping the image capturing can be, for example, when the image capturing start condition becomes unsatisfied. Alternatively, a different condition can be used. When the determination is affirmative, the control unit 104 performs step S49. When the determination is negative, the control unit 104 performs step S50.

In step S49, the control unit 104 sets the image capturing device 70 to the stop mode. Then, the control unit 104 performs step S31.

In step S50, the control unit 104 determines whether or not information obtained by the reception unit 102 satisfies the image stabilization condition. When the rider or the frame 12A is shaken hard, the control unit 104 functions to stabilize images so that viewers can be provided with images that are easy to view. When the determination is affirmative, the control unit 104 performs step S51. When the determination is negative, the control unit 104 performs step S52 Further, the level of the image stabilization can be determined.

In step S51, the control unit 104 performs the image stabilization on the image captured by the image capturing unit 90 and continues the image stabilization in the following steps.

In step S52, the control unit 104 determines whether or not information obtained by the reception unit 102 satisfies the view angle change condition. When traveling at a place with nice scenery, a further preferred image can be captured by changing the angle of view. When the determination is affirmative, the control unit 104 performs step S53. When the determination is negative, the control unit 104 performs step S54. Further, the level of the image stabilization can be determined.

In step S53, the control unit 104 changes the angle of view of the image captured by the image capturing unit 90 and continues the change in the following steps.

In step S54, the control unit 104 determines whether or not information obtained by the reception unit 102 satisfies the image combination condition. The second image capturing unit 120 can capture images of the rear of the bicycle 10, the expression of the rider, movement of the rider when operating the operation unit M, movement of the bicycle 10 as viewed from a distant point, and the like. When an image captured by the second image capturing unit 120 is combined with an image captured by the image capturing unit 90, a more exiting image can be created. When the determination is affirmative, the control unit 104 performs step S55. When the determination is negative, the control unit 104 performs step S41.

In step S55, the control unit 104 combines the image captured by second image capturing unit 120 with the image captured by the image capturing unit 90. The image captured by the second image capturing unit 120 can be combined with a partial region of the image captured by the image capturing unit 90 or vice versa. Alternatively, the image captured by the second image capturing unit 120 can be combined with the image captured by the image capturing unit 90 at a predetermined time or vice versa.

In the stop mode and the image capturing mode, that is, steps S31 to S35 and S41 to S49, the interruption process is performed when the button 76 is pressed.

In step S61, the control unit 104 determines the kind of the button signal. When receiving the image capturing button signal, the control unit 104 performs step S62 When receiving the setting button signal, the control unit 104 performs step S63. When receiving the power button signal, the control unit 104 performs step S65. When receiving the stop button signal, the control unit 104 performs step S67.

In step S62, the control unit 104 sets the image capturing device 70 to the image capturing mode and performs step S41.

In step S63, the control unit 104 determines whether or not the present mode is the stop mode. When the determination is affirmative, the control unit 104 performs step S64. When the determination is negative, the control unit 104 performs step S62.

In step S64, the control unit 104 sets the image capturing device 70 to the setting mode and performs step S21.

In step S65, the control unit 104 determines whether or not the power button 76A has been pressed for a predetermined time. One example of the predetermined time is four seconds. When the determination is affirmative, the control unit 104 performs step S66. When the determination is negative, the control unit 104 performs step S67.

In step S66, the control unit 104 sets the image capturing device 70 to the power off mode and terminates the image capturing process.

In step S67, the control unit 104 sets the image capturing device 70 to the stop mode and performs step S31.

MODIFIED EXAMPLES

The above description illustrates embodiments of the bicycle image capturing device according to the present invention and is not intended to be restrictive. The embodiments of the bicycle image capturing device according to the present invention can be modified as follows. Further, two or more modified examples can be combined.

The image capturing device 70 can include any element. In a first example, the image capturing device 70 includes two image capturing units 90. The two image capturing units 90 allow for recording of a three-dimensional image. In a second example, the image capturing device 70 does not include the display unit 74. The image capturing device 70, which is free of the display unit 74, consumes less power of the battery 77. This prolongs the operation time of the image capturing device 70. The rider can view captured images on the smartphone 114.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A controller for a bicycle image capturing device comprising:
    a reception unit configured to obtain information from at least one bicycle sensor of a bicycle, the information including a gear ratio of a bicycle shifting device of the bicycle, which is operated by an operation portion and operable in at least a first state and a second state that differs from the first state; and
    an electronic control unit configured to control a first image capturing unit to switch an operation mode of the first image capturing unit to an image capturing mode that captures an image upon determining that the information obtained by the reception unit satisfies at least one image capturing start condition, the at least one image capturing start condition including the gear ratio of the bicycle shifting device being maximal.

2. The controller according to claim 1, wherein the reception unit is configured to obtain information related to a bicycle suspension of the bicycle.

3. The controller according to claim 1, wherein the reception unit is configured to obtain information related to an adjustable bicycle seatpost of the bicycle.

4. The controller according to claim 1, wherein the reception unit is configured to obtain information related to a bicycle electric power assist unit that includes a motor to assist a rotation of a crank of the bicycle.

5. The controller according to claim 1, wherein the reception unit is further configured to obtain at least one of information related to a bicycle riding state of the bicycle and information related to a bicycle riding environment of the bicycle.

6. The controller according to claim 5, wherein
the reception unit is configured to obtain at least one of a cadence of the bicycle, human power that is input to the bicycle, a rotation speed of a wheel of the bicycle, pressure applied to the bicycle, a pressure applied to the bicycle shifting device, an inclination of the bicycle, and a geographical position of the bicycle, and
the electronic control unit is configured to set the at least one image capturing start condition to include a condition based on at least one of the cadence, the human power, the rotation speed, the pressure, the inclination, and the geographical position.

7. The controller according to claim 1, wherein the reception unit is further configured to obtain information related to a rider of a bicycle from at least one rider sensor.

8. The controller according to claim 7, wherein
the reception unit is configured to obtain at least one of a heart rate of the rider, a temperature of the rider, a perspiration amount of the rider, and movement of the rider, and
the electronic control unit is configured to set the at least one image capturing start condition to include a condition based on at least one of the heart rate, the temperature, the perspiration amount, and the movement.

9. The controller according to claim 1, wherein the electronic control unit is configured to switch an operation mode of the first image capturing unit to a stop mode that stops capturing an image upon determining the information obtained by the reception unit satisfies at least one image capturing stop condition.

10. The controller according to claim 1, wherein the electronic control unit is configured to receive an input for changing the image capturing start condition, and configured to change the image capturing start condition based on the received input, the image capturing start condition being changeable to at least one of a damping ratio of a suspension of the bicycle being maximal, an adjustable seatpost of the bicycle being located at a highest position, and an output of an assist motor of an electric power assist unit of the bicycle being maximal in addition to the gear ratio of the bicycle shifting device being maximal.

11. The controller according to claim 9, wherein the electronic control unit is configured to receive an input for changing the image capturing stop condition, and configured to change the image capturing stop condition based on the received input.

12. The controller according to claim 1, wherein the electronic control unit is configured to determine whether or not to record an image captured by the first image capturing unit to a recording medium based on the information obtained by the reception unit.

13. The controller according to claim 1, wherein the electronic control unit is configured to determine from the information obtained by the reception unit whether or not to enable an image stabilization process performed by one of the electronic control unit and the first image capturing unit.

14. The controller according to claim 1, wherein the electronic control unit is configured to determine whether or not to change an angle of view of the first image capturing unit based on the information obtained by the reception unit.

15. The controller according to claim 1, wherein
the electronic control unit is configured to control a second image capturing unit based on the information obtained by the reception unit, and configured to combine an image captured by the first image capturing unit with an image captured by the second image capturing unit.

16. The controller according to claim 1, wherein
the reception unit is configured to obtain information through wired communication or wireless communication.

17. A controller for a bicycle image capturing device configured to capture an image of surrounding scenery of a bicycle to be presented to a rider, the controller comprising:
a reception unit configured to obtain information from at least one of a torque sensor and a power meter, the torque sensor being arranged and configured to detect a torque applied a crank of a bicycle and the power meter being arranged and configure to measure a driving power applied to the bicycle; and
a control unit configured to control a first image capturing unit to switch to an image capturing mode that captures an image upon determining that the information obtained by the reception unit satisfies at least one image capturing start condition that is based on the information obtained by the reception unit.

18. A controller for a bicycle image capturing device that is used with a bicycle including a bicycle component and an operation portion for operating the bicycle component, the bicycle component being at least one of a shifting device, a suspension, an adjustable seatpost, and an electric power assist unit having an assist motor to assist propulsion of the bicycle, the controller comprising:
an interface configured to communicate with the bicycle component through a wired data link or a wireless data link to receive one or more data sets related to the bicycle component, the bicycle component being operable in at least a first state and a second state that differs from the first state using the operation portion; and
a processor directly or indirectly connected to the interface and a first image capturing unit of the bicycle image capturing device, the processor being configured to control the first image capturing unit to switch an operation mode of the first image capturing unit to an image capturing mode that captures an image upon determining that the information obtained by the reception unit satisfies at least one image capturing start condition,
the at least one image capturing start condition including at least one of a gear ratio of the shifting device being maximal, a damping ratio of the suspension being maximal, the adjustable seatpost being located at a highest position, and an output of the assist motor being maximal.

19. A bicycle image capturing device comprising the controller according to claim 1.

20. A controller for a bicycle image capturing device comprising:
a reception unit configured to obtain information related to a plurality of bicycle components from a plurality of bicycle sensors, the plurality of bicycle components including a bicycle shifting device, a bicycle suspension, a bicycle adjustable seatpost, and a bicycle electric power assist unit arranged to assist a rotation of a crank; and
an electronic control unit configured to control a first image capturing unit based on the information obtained by the reception unit, wherein
the information includes a gear ratio of the bicycle, a damping ratio of the bicycle suspension, a position of the adjustable seatpost, and an output of the bicycle electric power assist unit, and
an electronic control unit configured to control a first image capturing unit to switch to an image capturing mode that captures an image upon determining that the information obtained by the reception unit satisfies at least one image capturing start condition, the at least one image capturing start condition including at least one of the gear ratio being maximal, the damping ratio being maximal, the position of the adjustable seatpost being at a highest position, and the output of the bicycle electric power assist unit being maximal.

21. The controller according to claim 20, wherein
the bicycle electric power assist unit includes a motor to assist the rotation of the crank, and
the reception unit is configured to obtain information related to an output of the motor.

22. The controller according to claim 18, wherein
the at least one image capturing start condition is satisfied when the gear ratio of the shifting device is maximal, the damping ratio of the suspension is maximal, the adjustable seatpost is located at the highest position, and the output of the assist motor is maximal.

23. The controller according to claim 20, wherein
the at least one image capturing start condition is satisfied when the gear ratio of the shifting device is maximal, the damping ratio of the suspension is maximal, the adjustable seatpost is located at the highest position, and the output of the assist motor is maximal.

* * * * *